United States Patent Office 3,485,040
Patented Dec. 23, 1969

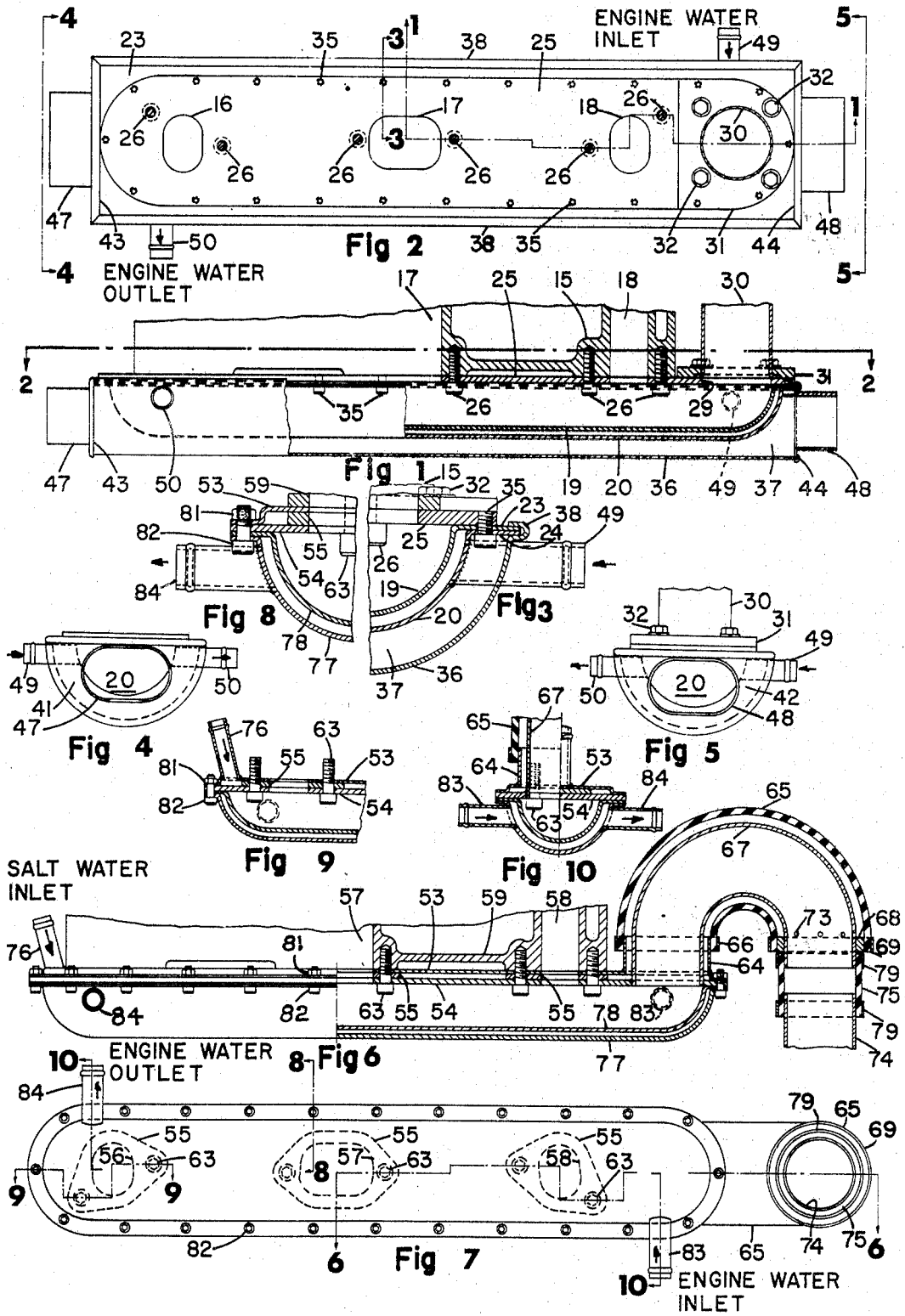

3,485,040
WATER COOLED EXHAUST MANIFOLD FOR INTERNAL COMBUSTION ENGINES
Axel B. Niskanen, 429 NW. 3rd Ave., Boynton Beach, Fla. 33435
Filed June 17, 1968, Ser. No. 737,489
Int. Cl. F01n 3/04
U.S. Cl. 60—30                                    10 Claims

ABSTRACT OF THE DISCLOSURE

An exhaust gas manifold for internal combustion engines for either marine or automobile use. In both versions the manifold has a double outer wall through which a portion of the hot fresh water from the engine block is passed to cool the manifold. This hot fresh water may then be recombined with the rest of the fresh water, which has been cooled in a separate cooler, and all of the water returned to the engine block. In the marine version there is also a double inner wall through which is passed cold water, which may be salt water. This is then discharged into the exhaust pipe after being heated while cooling the exhaust gas manifold.

Background of the invention

The exhaust gases discharging from the exhaust ports of an internal combustion engine are of extremely high temperatures of 1500° F. or more. This causes heating of the exhaust manifold so that sometimes it cracks or the bolts securing the manifold break, and repairs are required. My invention pertains to the cooling of the gases in the exhaust manifold and recovery of the heat therein for use as space heating or for other purposes. In the case of marine engines my invention also provides a closed circuit for the engine water and utilizes raw sea water, lake or river water for cooling the exhaust manifold and exhaust pipe. In this case, the major portion, say 90% of the engine water is cooled by passing it through a conventional heat exchanger such as a keel cooler or the like while the remaining 10% is used to cool the exhaust manifold. This portion is then recombined with the other 90% and the mixture is returned to the engine block. In this manner, a desirable engine water operating temperature of 190° F. or more is attainable, whereas if raw river, lake or sea water is used for engine cooling an engine, water operating temperature of 130° F. is barely attainable.

Closed engine cooling water systems for marine engines are well known. Among these are keel coolers or heat exchangers, including those secured to the sides or bottom of the boat and through which the engine water circulates. An example of a system for adapting an internal combustion engine for use as a marine engine is shown in the U.S. Patent 3,015,324, issued Jan. 2, 1962, to Lehman. My system is of simple construction, easily assembled or disassembled, and uses a combination of engine water and river, lake or sea water for cooling the manifold.

Brief summary of the invention

A pair of spaced concentric water jacket walls are secured to a base plate mounted upon the engine block or cylinder head to form an exhaust gas manifold. Means are provided for hot engine water to enter and leave the space between the water jacket walls. In the marine version a second base plate is spaced from the aforesaid base plate. Raw lake, river or sea water is passed through this space to cool the exhaust gases and then discharged into the exhaust pipe to cool it. In either version a hot air duct may surround the outer jacket wall to heat air passing through the duct, which heated air may then be used for space heating.

It is therefore a principal object of the invention to provide a novel engine exhaust gas manifold which is cooled by circulating engine water.

Another important object of the invention is the provision of an engine exhaust gas manifold which is cooled by a combination of engine water and lake, river or sea water.

Still another object of the invention is the provision of a water cooled engine exhaust manifold and a duct spaced from the manifold to heat air passing through the duct for use for space heating or the like.

For further comprehension of the invention and of the objects and advantages thereof, reference will be had to the following description and accompanying drawings, and to the appended claims in which the various novel features of the invention are more particularly set forth.

Detailed description of the invention

In the accompanying drawings forming a material part of this disclosure:

FIGURE 1 is a side view of a first embodiment, partly in section along the line 1—1 of FIGURE 2;

FIGURE 2 is a view along line 2—2 of FIGURE 1, looking in the direction of the arrows, but with the engine cylinder head omitted;

FIGURE 3 is an enlarged transverse sectional view along the line 3—3 of FIGURE 2, looking in the direction of the arrows;

FIGURE 4 is an end view of the manifold and its base plate substantially along the line 4—4 of FIGURE 1, looking in the direction of the arrows;

FIGURE 5 is an end view substantially along the line 5—5 of FIGURE 2 looking in the direction of the arrows, but with the engine cylinder head omitted;

FIGURE 6 is a side view of a second embodiment, partly in section along the line 6—6 of FIGURE 7, looking in the direction of the arrows;

FIGURE 7 is a bottom plan view of the manifold of FIGURE 6, but with the engine cylinder head omitted;

FIGURE 8 is an enlarged transverse sectional view substantially along the line 8—8 of FIGURE 7;

FIGURE 9 is a sectional view along the line 9—9 of FIGURE 7;

FIGURE 10 is a transverse sectional view along the line 10—10 of FIGURE 7.

Referring to the embodiment of FIGURES 1 to 7, a portion of the cylinder head is shown at 15 in FIGURE 1. The cylinder head exhaust gas ports are indicated at 16, 17, and 18 in FIGURES 1 and 2. These discharge into the exhaust manifold now to be described.

The exhaust gas manifold comprises a pair of spaced curved concentric inner and outer water jacket walls 19 and 20 of a non-ferrous metal such as copper which are substantially semicircular in cross section, terminating in radially outwardly extending peripheral flanges 23 and 24 shown best in FIGURE 3. These flanges abut each other and are preferably soldered or brazed together to make the space between inner and outer walls 19 and 20 watertight.

A manifold base plate 25 is secured to the engine cylinder head 15 by three pairs of cap screws 26, the heads of which may be hexagonal but are preferably of the "Allen head" type. The manifold base plate 25 also has a circular exhaust port 29 in alignment with an exhaust pipe 30 which is outwardly flanged at its bottom as viewed in FIGURE 1. The flange on the exhaust pipe 30 is clamped against base plate 25 by a plate 31 having a circular hole therein large enough so that the plate 31 may slide over the exhaust pipe 30. The plate 31 has a circular recess surrounding the hole therein at the bottom thereof and of such depth that when it is clamped against the base plate 25 by cap screws 32 it also clamps the flange on the exhaust pipe 30 to thus rigidly secure the exhaust pipe to the base plate 25.

The water jacket inner and outer walls 19 and 20 are secured to the manifold base plate 25 by a series of cap screws 35 passing through the flanges 23 and 24 of the inner and outer walls 19 and 20 and threaded into the base plate, as best shown in the enlarged sectional view of FIGURE 3. In the embodiment shown in FIGURES 1–5 the flanges 23 and 24 extend substantially beyond the edges of the base plate 25.

A hot air duct 36 is spaced from and concentric with the water jacket outer wall 20 to form an air passageway 37 therebetween. Along its upper edges, as best seen in FIGURE 3, the duct 36 has inwardly facing U-shaped channels 38 which have a force fit around the outer edges of the flanges 23 and 24, to secure the duct to these flanges.

At its two ends the hot air duct 36 has transverse wall members 41 and 42 best shown in FIGURES 4 and 5 that have U-shaped channels 43 and 44 around their peripheries which have a force fit over the flanges 23 and 24 of the water jacket walls 19 and 20 and also against the two ends of hot air duct 36. The transverse wall members 41 and 42 have inlet and outlet connections 47 and 48 communicating with the interior of the hot air duct and to which may be secured conduits, not shown, leading to and from the interior of a space to be heated, such as the passenger compartment of an automobile or the like.

An engine water inlet 49, best shown in FIGURE 3 passes through the wall of hot air duct 36 and the water jacket outer wall 20 to deliver hot engine water into the space between walls 19 and 20. An outlet 50 at the other end of the water jacket discharges the water for return to the engine block. This discharge water may be passed through a suitable cooler before returning to the engine block.

Marine version

FIGURES 6 to 10, inclusive, illustrate another embodiment wherein cold lake, river or salt water is also utilized to cool the exhaust gases passing through a double walled manifold similar to the manifold of FIGURES 1–5.

In this version there are a pair of spaced base plates 53 and 54 of non-ferrous metal separated by spacer plates 55 shown in outline in FIGURE 7. The base plates 53 and 54 and the spacer plates 55 have openings therethrough in alignment with the exhaust gas ports 56, 57 and 58 in the engine cylinder head 59. The base plates and spacer plates are secured to the engine cylinder head by cap screws 63, there being a pair of cap screws for each spacer plate 55, on opposite sides of the cylinder head exhaust ports, as best seen in FIGURE 7.

Adjacent their right ends as viewed in FIGURE 6 the base plates 53 and 54 have ports therethrough, the one in plate 53 being larger in diameter than the one in plate 54 and having a tubular member 64 secured thereto for connection of a U-shaped hose 65 of rubber or the like, which is fastened to member 64 by a clamp 66. A U-shaped non-ferrous metallic tubular member 67 is secured to the opening in the base plate 54 and is arranged substantially concentrically within the rubber hose 65, terminating slightly beyond the end of the rubber hose, there being an annular spacer 68 therebetween and a clamp 69 to secure the end of the hose 65 to the spacer 68. A series of equiangularly spaced holes 73 through the metallic tubular member 67 above the spacer 68 serve a purpose to be described. An exhaust pipe 74 is secured to the protruding end of tubular member 67 as by a rubber hose 75 and a pair of clamps 79.

Cold lake, river or salt water is admitted to the space between base plates 53 and 54 through an inlet 76 shown in FIGURES 6 and 9. It flows from left to right as viewed in these figures, passing between the base plates 53 and 54, around the spacer plates 55, through the annular space between hose 65 and tubular member 67 and discharges into the exhaust pipe 74 through the spaced holes 73 in the tubular member 67. This cold salt water between the base plates 54 and 55 serves to cool the exhaust gases in the exhaust gas manifold formed by base plate 54 and the concentric spaced inner and outer walls 77 and 78 which are similar to the inner and outer walls 19 and 20 of the embodiment shown in FIGURES 1–5.

As best shown in FIGURE 8, the inner and outer walls 78 and 77 are flanged at their ends and are secured to the base plates 53 and 54 by a series of nuts 81 and bolts 82 adjacent their peripheries. The flanges of the inner and outer walls are sealed in a water-tight manner such as brazing or the like.

Hot engine water is admitted to the space between inner wall 78 and outer wall 77 by an engine water inlet 83 which passes through the outer wall 78. The now hotter engine water is discharged from this space through an engine water outlet 84 which passes through the outer wall 78. From the outlet 84 the water is returned to the engine after recombining with the cold engine water from the keel cooler or the like.

It is apparent that the version of FIGURES 1–5 may be provided with a second base plate separated from the base plate 25 by spacers in a manner similar to the marine version of FIGURES 6–10 and that engine water may be passed through this space as it is between the walls 19 and 20 forming the manifold.

Also, the marine version of FIGURES 6–10 may be provided with a hot air duct similar to the duct 36 of FIGURES 1–5.

What is claimed and desired to be secured by Letters Patent is:

1. An internal combustion engine exhaust gas manifold comprising,
    (a) a base plate secured to the engine cylinder head, having passages therethrough in alignment with the exhaust gas ports in the engine cylinder head and another passage therethrough for connection to an exhaust pipe,
    (b) a pair of spaced concentric inner and outer metallic wall members, secured together in a watertight manner at their outer edges, and secured to said base plate at their peripheries, said inner metallic wall member being substantially spaced from said base plate to form with said base plate an exhaust gas manifold for collecting exhaust gases from said first mentioned passages in said base plate to said other passage leading to an exhaust pipe, and
    (c) inlet and outlet pipes adjacent the opposite ends of said concentric inner and outer wall members and connected to the space between said wall members for admitting and discharging a liquid to and from the space between said wall members.

2. The device described in claim 1 wherein,
    (a) said spaced concentric inner and outer wall members are curved in transverse cross-section and terminate at their outer edges in outwardly extending flanges, and
    (b) means for securing said flanges to said manifold base plate.

3. In the device described in claim 2,
    (a) a hot air duct surrounding and spaced from said metallic outer wall member and secured to said inner and outer wall members,
    (b) said duct having a transverse wall member at one end, and
    (c) a hot air outlet connection at an opening in said transverse wall member for connection to a conduit leading to a space to be heated.

4. In the device described in claim 3,
    (a) a second transverse wall member at its other end, and (b) a return air inlet connection at an opening in said second transverse wall member for connection to a conduit leading from the space to be heated.

5. The device described in claim 1 wherein,
(a) said passage in said base plate for connection to an exhaust pipe is substantially coplanar with said passages in said base plate in alignment with the exhaust gas ports in the engine cylinder head.

6. The device described in claim 1 wherein
(a) a second base plate is provided, spaced from said first mentioned base plate,
(b) spacer plates between said base plates, and
(c) means for admitting and discharging water to and from the space between said base plates.

7. The device described in claim 6, wherein
(a) said water discharging means comprises a first tubular member affixed to said second base plate and surrounding an opening through said second base plate, and a second tubular member smaller in diameter than said first tubular member and concentrically within said first tubular member, said second tubular member being affixed to said first mentioned base plate and surrounding an opening therein.

8. The device described in claim 7 wherein,
(a) said second tubular member is curved, extending upwardly and then downwardly, and
(b) means for connecting the lower end of said downwardly extending portion to an exhaust pipe.

9. In the device described in claim 8,
(a) the lower end portion of said second tubular member having a series of holes therethrough, and
(b) a third tubular member connected to said first tubular member, concentric with and spaced from said second tubular member and extending below said holes in the lower end portion of said second tubular member, and
(c) a spacer between said first and second tubular members below the holes in said first tubular member, whereby the water between said second tubular member and said third tubular member discharges through the holes in said second tubular member and flows into an exhaust pipe.

10. The device described in claim 9 wherein said third tubular member is of flexible rubber-like material.

References Cited

UNITED STATES PATENTS

| | | | |
|---|---|---|---|
| 900,083 | 10/1906 | Clark | 60—31 |
| 976,610 | 11/1910 | Shultz | 60—31 |
| 1,622,498 | 3/1927 | Dunn | 60—31 |
| 2,067,253 | 1/1937 | Wohanka | 60—31 |
| 2,757,650 | 8/1956 | Holley | 60—31 |
| 3,169,365 | 2/1965 | Benjamin | 60—29 |

MARK M. NEWMAN, Primary Examiner

D. HART, Assistant Examiner

U.S. Cl. X.R.

60—31